April 3, 1945.   A. H. BICKER   2,372,705
TRAILER JACK
Filed Aug. 1, 1944
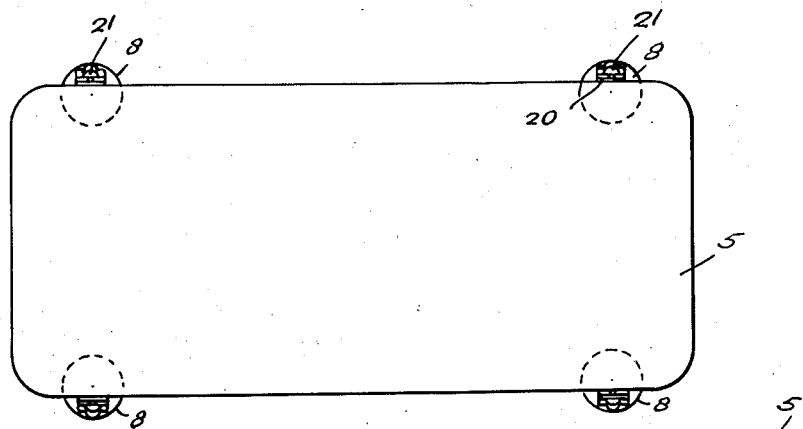
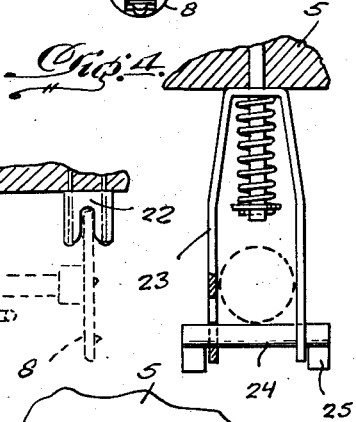
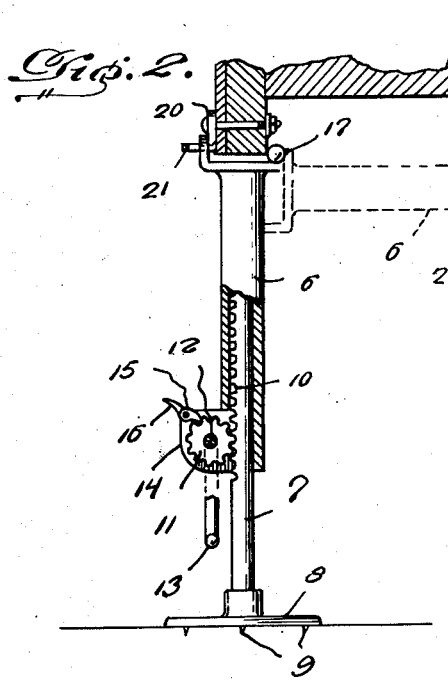
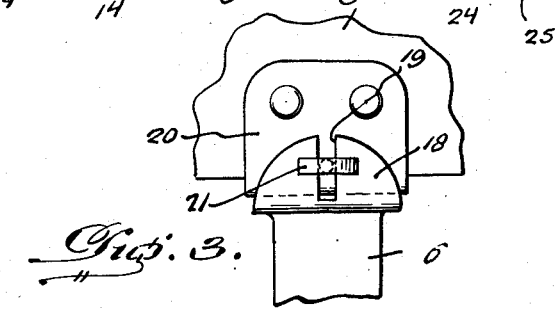
Inventor
Albert H. Bicker,
By
Attorneys Patented Apr. 3, 1945

2,372,705

UNITED STATES PATENT OFFICE 2,372,705

TRAILER JACK

Albert H. Bicker, Avon Park, Fla.

Application August 1, 1944, Serial No. 547,530

1 Claim. (Cl. 254—86)

This invention relates to trailer jacks, and has for its primary object the provision of a device of this character which may be quickly brought into position of supporting a trailer and thereby relieve the wheels of said trailer of the load, and for leveling the trailer body, and may be easily arranged in an inactive position and held against creating noise and from being lost when the trailer is in transit.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a diagrammatic view showing generally a body of a trailer equipped with jacks constructed in accordance with my invention.

Figure 2 is a fragmentary sectional view, partly in elevation, showing one of the jacks and its connection with the trailer body.

Figure 3 is a fragmentary front elevation showing means of releasably securing the jack in supporting position.

Figure 4 is a fragmentary sectional view showing a yieldable hanger for supporting the jack in an inactive position.

It is proposed to apply to the body of a trailer adjacent each end and upon opposite sides thereof jacks for the support of the body indicated generally by the character 5 to relieve the load on the wheels (not shown) of the trailer, and also for leveling the body. This is desirable when the trailer is left in a standing position and used for purposes other than in transit. The jacks are so constructed that each may be easily operated as to length and also may be swung to an inoperative position whenever desired and supported in this position, so that the jacks may remain a part of the body of the trailer at all times, or when the trailer is in transit to prevent loss or misplacement of the jacks.

Reference to one of the jacks specifically is thought to be sufficient for all employed in connection with the trailer. The jack primarily consists of a cylinder 6 slidably receiving a rod 7 provided with a foot plate 8. The foot plate has teeth 9 to bite into a supporting surface. The rod 7 is provided with teeth 10 engaged by a gear 11 secured on an operating shaft 12. The operating shaft includes a crank handle 13 whereby the gear may be rotated for sliding the rod relative to the cylinder. The operating shaft 12 is journaled in a housing 14 providing a part of the cylinder 6 with the gear 11 rotated within the housing. A dog 15 is pivoted on the housing to engage with the gear and includes a finger piece 16 whereby the dog may be disengaged from the gear whenever it is desired to adjust the rod 7 relative to the cylinder through the rotation of the operating shaft. The dog engaging the gear acts to secure the rod 7 against adjustment relative to the cylinder.

The cylinder has a flat head 17 provided with an angularly arranged lip 18 bifurcated, as shown at 19. Hinged to one end of the head is an L-shaped attaching plate 20 bolted or otherwise secured on the frame of the body of the trailer and carries a turn-button 21 to enter the slot 19 and be turned for releasably securing the cylinder in operative position. When in this position, the head is resting flatly against the bracket. However, the cylinder may be swung upon the hinge so that the jack may assume a horizontal position, as shown in dotted lines in Figure 2, with the foot engaging in a bifurcated cushion block 22 secured on the trailer.

A hanger 23 is yieldably supported on the trailer and is of substantially U shape to straddle the cylinder when the latter is in an inoperative position and a pair of arms thereof are provided with keyhole slots to receive a pin 24 underlying the cylinder of the jack thereby securing the jack horizontally with the foot piece tightly engaged within the bifurcated cushion block 22. Lugs 25 are formed on the pin 24 to prevent accidental displacement thereof from the hanger 23. The jack when supported in an inoperative position, as shown in dotted lines in Figure 2, will be out of the way and will be held against rattling or making unnecessary noise. By having the jack thus supported, it remains a part of the trailer and thereby is prevented from being lost. This construction of supporting the jack in an inoperative position will permit the jack to be easily swung into an operative or vertical position with the foot in engagement with the ground so that the trailer may be elevated and supported by the jack.

While I have shown and described a preferred embodiment of my invention, it will be understood that minor changes in construction, combination and arrangement of parts may be made without departing from the spirit and scope of the invention as claimed.

Having thus described my invention, what I claim is:

In a trailer jack, a cylinder including a head having an angular bifurcated lip, an L-shaped attaching plate hinged on said head and secured to a trailer, a button journaled on said bracket to be received in the bifurcation of the lip for releasably securing the cylinder in a vertical position, a rod slidable in the cylinder including a foot, an operating shaft journaled on the cylinder, a gear secured to said shaft, teeth on said rod meshing with the gear, and a pivoted dog to engage the gear for releasably securing the gear against rotation.

ALBERT H. BICKER.